United States Patent
Bellosi et al.

(10) Patent No.: US 9,961,202 B2
(45) Date of Patent: May 1, 2018

(54) AUTOMATED CALL CLASSIFICATION

(71) Applicant: NICE LTD., Ra'anana (IL)

(72) Inventors: Facundo Bellosi, London (GB); Leonard Michael Newnham, Calvert (GB); Tomer Ram, Netanya (IL)

(73) Assignee: NICE LTD., Ra'anana (IL)

( * ) Notice: Subject to any disclaimer, the term of this patent is extended or adjusted under 35 U.S.C. 154(b) by 173 days.

(21) Appl. No.: 14/985,533

(22) Filed: Dec. 31, 2015

(65) Prior Publication Data

US 2017/0195487 A1 Jul. 6, 2017

(51) Int. Cl.
*H04M 5/00* (2006.01)
*H04M 3/51* (2006.01)
*G06F 17/30* (2006.01)

(52) U.S. Cl.
CPC .... *H04M 3/5175* (2013.01); *G06F 17/30525* (2013.01); *G06F 17/30598* (2013.01)

(58) Field of Classification Search
CPC .............. H04M 3/5175; G06F 17/30525
USPC .......... 279/265.03; 379/265.01–265.14, 379/266.01–266.1, 309
See application file for complete search history.

(56) References Cited

U.S. PATENT DOCUMENTS

| | | | |
|---|---|---|---|
| 7,643,686 B2 * | 1/2010 | Kraus | G06F 17/30265 |
| | | | 382/225 |
| 8,620,840 B2 | 12/2013 | Newnham et al. | |
| 8,909,590 B2 | 12/2014 | Newnham et al. | |
| 8,909,644 B2 | 12/2014 | Newnham et al. | |
| 8,914,314 B2 | 12/2014 | Newnham et al. | |
| 8,924,318 B2 | 12/2014 | Newnham et al. | |
| 9,076,156 B2 | 7/2015 | Newnham et al. | |
| 9,165,053 B2 * | 10/2015 | Hernandez | G06F 17/30598 |
| 2004/0267893 A1 * | 12/2004 | Lin | H04L 51/12 |
| | | | 709/207 |
| 2005/0160340 A1 * | 7/2005 | Abe | G06N 99/005 |
| | | | 714/746 |
| 2008/0250060 A1 * | 10/2008 | Grois | G06F 17/30864 |
| 2009/0006085 A1 * | 1/2009 | Horvitz | G10L 17/26 |
| | | | 704/223 |
| 2009/0297032 A1 * | 12/2009 | Loui | G06F 17/30256 |
| | | | 382/195 |
| 2014/0114891 A1 | 4/2014 | Newnham et al. | |
| 2014/0280150 A1 * | 9/2014 | Hernandez | G06F 17/30598 |
| | | | 707/737 |

(Continued)

*Primary Examiner* — William Deane, Jr.
(74) *Attorney, Agent, or Firm* — Pearl Cohen Zedek Latzer Baratz LLP

(57) ABSTRACT

A computing system is configured to categorize digital data records each relating to an interaction between a call center agent and a customer. The system includes a rules module to determine a first probability that a data record belongs to a category based one or more rules each rule defining a relationship between one or more features of the data record and the category; a probabilistic module to determine a second probability that the data record belongs to the category based on one or more probabilistic models of relationships between one or more of the features and the category; an arbitration module to determine whether or not the data record belongs to the category based on the first and second probabilities; and an action module to receive from the arbitration processor an indication that the interaction belongs to the category and to initiate an action appropriate to the category.

16 Claims, 12 Drawing Sheets

(56) References Cited

U.S. PATENT DOCUMENTS

| | | |
|---|---|---|
| 2015/0100526 A1 | 4/2015 | Newnham et al. |
| 2016/0189176 A1 | 6/2016 | Zeltcer et al. |
| 2016/0292706 A1 | 10/2016 | Newnham |
| 2017/0011414 A1 | 1/2017 | Newnham |
| 2017/0195487 A1 | 7/2017 | Bellosi et al. |

* cited by examiner

- $C$: call reason, [true|false]
- $R_i$: the $i^{th}$ rule for call reason $C$, [true|false]
- There are $N$ rules for call reason $C$

AUTOMATED CALL CLASSIFICATION

The present invention is in the field of operating call centers and particularly to categorizing calls according to the reason for a call or other interaction.

BACKGROUND OF THE INVENTION

The typical process, when a customer calls a call center, is as follows:
Customer explains problem to agent
Agent solves problem, takes some action and writes up any relevant notes
Agent moves to the next call.

It is desirable to accurately assign reasons to calls and other interactions between parties for many reasons, for example in order to ensure that the call reason is resolved.

For some call reasons it may be possible to automatically determine with some accuracy the reasons for the call from the actions of the agent. An agent may use an application running on an agent device such as a computer to record details about a call and perform actions on behalf of the caller such as processing a payment. The application may be part of a system operating at the call center. If a call center system generated an automatic code PAY then it may be automatically assumed that the call was about payments. In this example code PAY may be generated automatically whenever the agent manually makes a payment on the customer's account and a call reason "payment" may be automatically assigned. Such examples lend themselves to using a system of rules to automatically identify call reasons and thereby categorize calls. However they are limited to the accuracy of the rule.

It is possible to categorize calls automatically using any of a set of defined rules, the agents' contemporaneous notes, speech e.g. converted to text, as well as any system codes that may be generated during the call denoting the actions taken by the agent. The rules may define binary relationships between call features and call category, e.g. if code 'REFCREDIT' is present, then call category is REFUND.

Many call reasons are far more difficult to determine. There may only be clues from the agent's contemporaneous notes or the agent's or caller's speech where the presence of certain keywords may each slightly increase the probability of a particular call reason. In situations such as this, where there are many small clues that add up to a weight of evidence suggesting a particular call reason, then simple rules become difficult to specify and clumsy to use.

In a system for automatically analyzing call center data, data may be loaded at intervals, e.g. nightly, running through a pipeline where many aggregations are performed on the data, including the assignment of call reasons to calls. The assigned call reasons may then be used in various automated processes.

The use of pre-defined, e.g. binary, rules is not an optimal solution for many reasons including:
They need considerable time, possibly a number of months, for tuning to avoid too many false positives or false negatives.
They do not work well for call reasons where there is no clear associated action from the agent.
The setup process needs to be repeated in full for different call center applications, e.g. banking, retail, etc.

SUMMARY

Some embodiments of the invention provide a computer system for categorization of digital data records each relating to an interaction between a call center agent and a customer. Each digital data record will have one or more features such as codes and text elements that may be used in the categorization. The system may comprise one or more processing modules including: a rules module configured to receive as input a data record and to determine a first probability that the data record belongs to a category based one or more rules each defining a relationship between at least one of said features and the category; a probabilistic module configured to receive as input said data record and to determine a second probability that the data record belongs to the category based on one or more probabilistic models of relationships between one or more of said features and the category; an arbitration module configured to determine whether or not the data record belongs to the category based on the first and second probabilities; and an action module configured to receive from the arbitration processor an indication that the interaction belongs to the category and to initiate an action appropriate to the category.

According to some embodiments of the invention, the processing modules are configured to perform the determinations for each of a plurality of categories.

Some embodiments of the invention provide a method of categorizing digital data records each relating to an interaction between a call center agent and a customer, each data record having one or more features, the method being carried out in a processor in a computer and comprising: receiving a data record; determining a first probability that the data record belongs to a category based one or more rules, each rule defining a relationship between at least one of said features and the category; determining a second probability that the data record belongs to the category based on one or more probabilistic models of relationships between one or more of said features and the category; determining whether or not the data record belongs to the category based on the first and second probabilities; and in response to a determination that a data record belongs to a category, initiating an action appropriate to the category.

The possible actions initiated by the action module may take many forms. One possibility is a further, e.g. follow-up, interaction between a call center agent and the customer relating to the category of the categorized interaction. Another possibility is the initiation of an interaction with another party, for example to prompt the other party to take some action relating to the customer. Another possible action is the setting of a flag to ensure that the call reason has been resolved. For example if the call related to a refund, the flag might initiate a check that the refund was processed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may be understood by reference to the following detailed description when read with the accompanied drawings. Some embodiments of the invention are illustrated by way of example and not limitation in the figures of the accompanying drawings, in which like reference numerals indicate corresponding elements, and in which:

DETAILED DESCRIPTION

Figure 1:
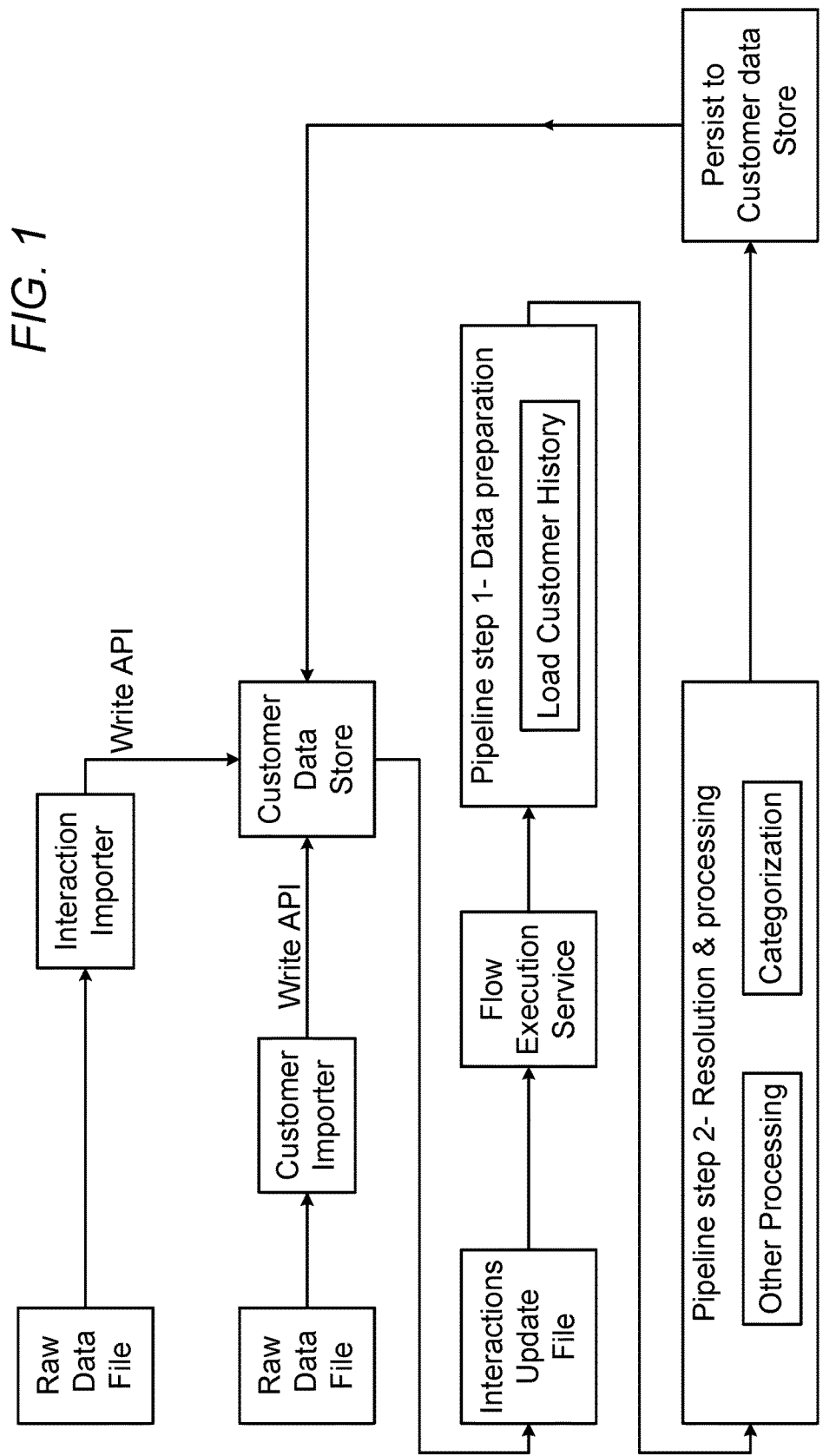
FIG. 1 is a block diagram of a call data analytics platform such as might be implemented in a call center according to some embodiments of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The following are further definitions of terms used in this description and in the field to which the invention relates:

"Agent" is used herein to denote one party to an interaction between parties, and may be for example a human call center employee or an IVR system.

"Customer" is used herein unless otherwise stated to refer to a caller to a call center. It is typical for call centers to be operated on behalf of third parties and therefore the customer of the call center operator is the third party, e.g. a retail organization or financial institution, and the caller is not necessarily a customer of the call center.

"Interactions" comprise any exchange between parties and may take place over one or more channels including but not limited to telephone, e.g. human to human conversations and exchanges with an interactive voice response "IVR" system (in which case the call center agent is not human), web chat, instant messaging, exchange of short message service "SMS" messages and exchange of email messages.

The terms "class" and "category" and similarly "classification" and "categorization" are used synonymously.

FIG. 1 is a block diagram of a call data analytics platform such as might be implemented in a call center according to some embodiments of the invention. Digital data records relating to interactions between a call center agent and a customer, such as call data, may be processed and analyzed in batches at regular intervals, e.g. nightly. The data records may comprise any of text, for example input by an agent, automatically generated codes, and audio recordings. Broadly speaking, in the diagram of FIG. 1, the data records are subject to a process termed "data preparation" in which the data is prepared for analysis and a process termed "resolution and processing" in which the data records are subject to several operations in any order including categorization. Both processes can include several processing modules as part of a flexible and expandable processing pipeline. Some embodiments of the present invention are related to the categorization, and may include additional functionality to prompt an automated action in response to categorization.

Some embodiments of the present invention may be used to categorize various interactions. The embodiments to be described with reference to the drawings may be used to provide an automated and efficient way to determine a customer's reason for calling a call center. Some embodiments of the invention may use heuristic information in the form of rules, such as might be provided by the customer of the call center on whose behalf the call center is being operated. Some embodiments of the invention may also use machine learning techniques. The addition of machine learning techniques can allow the system to:

Improve upon the performance of rules alone.

Continue to improve performance over time as new data becomes available.

Adapt to change over time.

Make the implementation process of call classification considerably simpler and more efficient.

According to some embodiments of the invention, the rules module and the probabilistic model module are both configured to use a set of correctly categorized interactions in the determination of the first and second probabilities, also referred to as "scores". Thus each of the modules may output a probability score. Therefore some embodiments of the invention may require, initially, a set of classification rules and a set of correctly classified calls.

The set of correctly classified calls may be used to estimate the probability of a data record belonging to a category if the data record has the one or more features mentioned in the first rule.

For the purpose of improvement of performance some embodiments of the invention may also use, after initial set-up, an ongoing stream of correctly classified calls.

The first rules may use a variety of features of the interaction or the data record relating to the interaction. Each rule may define a relationship between a feature of the data record or the interaction to which it relates and a category. Examples of features may include but are not limited to the presence of particular machine-generated codes indicating some action has been taken by the agent, and the presence of particular keywords in the agent notes or recorded speech.

An example classification rule may be: if the system generated automatic code PAY then the call was about payments. Here the code PAY is a feature and "payments" is the category. This example rule is binary in the sense that according to the rule the call is or is not in the class with no region of uncertainty.

The first set of rules may be extensive or it may be basic, just covering the easy to identify call reasons. The set of first rules may represent a starting point only for machine learning.

The set of correctly classified calls may be obtained in various ways. The business for which the call center is operated may have a corpus of call records along with a correct classification for each which may be used as training data.

A fraction of calls may be monitored and classified on an ongoing basis. These correctly classified calls, if available, may be used according to some embodiments of the invention to continue to learn over time to: a) improve performance, and b) adapt to change.

Systems according to some embodiments of the invention may have all three of first classification rules, an initial set of correctly classified calls and an ongoing stream of correctly classified calls. However, a system according to some embodiments of the invention may at least be initiated if any one of the three is available.

Figure 2:
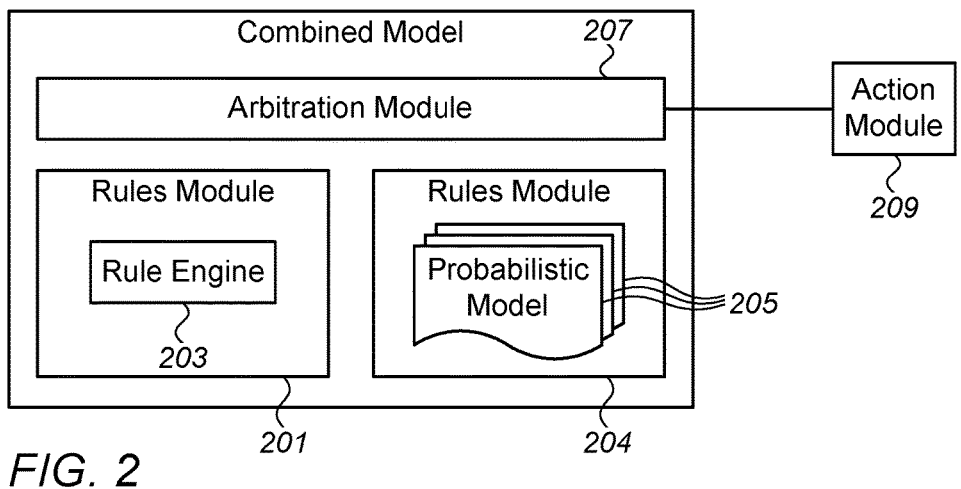
FIG. 2 shows an example high level architecture showing the general principles of operation of a system according to some embodiments of the invention.

FIG. 2 shows an example high level architecture showing the general principles of operation of a system according to some embodiments of the invention. The architecture of FIG. 2 comprises four modules.

A rules module 201 is configured to determine a first probability that a data record belongs to a category. According to some embodiments of the invention, the rules module 201 is configured to operate according to rules and, for example, output a decision as to whether a data record belongs to a category. This may be done using rule engine 203 which may determine for each data record and each rule whether one or more features specified in the rule are present in the data record and hence whether the rule "fires". The output of the rules module may be in binary form. However according to some embodiments of the invention, hard rules may be modified to become "soft" rules which indicate a probability that the data record belongs to the category. The probability output from the rules module 201 is also referred to herein as the "first" probability. The modification may be done with the aid of the set of correctly classified data records. The rule engine 203 is shown here as being part of the rules module 201 but in other embodiments of the invention, for example as illustrated with reference to FIGS. 6 to 13, it may be a separate module from which a decision as to which rule is applicable to which data record is output to the rules module 201 to enable the rules module 201 to determine the first probability. Thus the effect of the modification is to convert a hard rule such as "if feature X is present then the data record belongs to category Y" to a soft rule of the form "if feature X is present then there is a z % probability that the data record belongs to category Y".

A probabilistic module 204 may operate in parallel with the rules module 201 and is configured to determine a second probability that a data record belongs to a category. This determination can be based on probabilistic models 205 of relationships between the category and one or more features of the data record or the interaction to which it relates. The probabilistic models 205 may be trained if an ongoing supply of correctly classified data is available, so that they can learn over time to correctly classify calls.

Modules 203 and 305 may each output a respective probability determination to the arbitration module 207. The arbitration module can use these outputs to make a determination as to whether a data record, e.g. call, belongs to a particular category. The arbitration module 207 may operate according to a strategy which arbitrates in the event of disagreement between the first and second probabilities as to whether a call is appropriate to a category.

According to some embodiments of the invention, categorization is performed according to a combined model that obtains the benefits of rules, for example provided by a human operator, and probabilistic models.

The arbitration module can output the determination to the action module 209 which can be configured to initiate one or more actions action appropriate to the category. An action initiated by the action module 209 may comprise any of:

a further interaction between a call center agent and the customer, scheduling of a follow up interaction such as call or email or both to ensure that a problem is resolved, triggering of preemptive emails concerning issues known to be associated with the category, sending of discount vouchers, e.g. to targeted individuals where category, e.g. call reason, is repeated, automatic creation of customer history for the next agent receiving a call from that customer, an interaction between the customer and another party, and setting of a flag to check that a call reason has been resolved, any of which may take place in response to a positive determination that a data record belongs to a category.

Each module may comprise for example software being executed on a processor or multiple processors, and multiple modules may be executed on a single processor. Thus for example the modules shown in FIG. 2 may be implemented in a multi-core central processing unit. The operation of the modules will now be described in general terms, followed by more detailed descriptions with reference to the block diagrams and flow charts of FIGS. 6-14.

Rules Module

Rule engines generally consume rules of the form: if <some condition X> then <perform Y>, for example, if <some condition X> then <add call reason Y>. There may be several rules with the same action and if any one of these rules "fires", meaning the condition is satisfied, the call-reason will be added. This can result in binary, or hard, predictions, meaning that a call-reason is either assigned or not. Some embodiments of this invention use soft predictions which express the likelihood of a category being appropriate in percentage terms, for example: It is 60% probable that the call is Payment Arrangement. This is more realistic than a yes/no decision, as most rules are imperfect. Additionally, it better informs the strategy implemented in the arbitration module 207 for the purpose arbitrating between category predictions, or probabilities, output from the rules module and the probabilistic module respectively.

Figure 3:
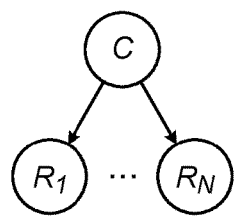
FIG. 3 depicts the relationship between the random variables involved in predicting a single call reason according to some embodiments of the invention.

According to some embodiments of the invention, first or "soft" probabilities, one for each call and each category, can be produced using the historical performance of the individual rules and Bayes law. FIG. 3 depicts the relationship between the random variables involved in predicting a single call reason C, in accordance with an illustrative embodiment of the invention.

The rules module 201 may be configured to calculate the probability that a category is correct, for example a call-reason assignment is true, given any combination of contributing rules, $R_1$ to $R_N$, firing.

The above is a conditional probability, specifically the posterior probability $P(C=true|R_1=r_1, \ldots, R_N=r_N)$, where $r_1, \ldots, r_N$ can have values "true" or "false" depending on which subset of N rules fired for a particular call. The determination can be done using Bayes theorem, as follows:

$$P(C = \text{true} \mid R_1 = r_1, \ldots, R_N = r_N) = \frac{P(C = \text{true}, R_1 = r_1, \ldots, R_N = r_N)}{P(R_1 = r_1, \ldots, R_N = r_n)} \quad \text{Equation 1}$$

In equation 1 the numerator represents the probability that the same subset of rules fired AND the call reason C was the correct reason. The denominator represents the probability that this particular subset of rules has fired. Using Bayes theorem, equation 1 can be represented in terms of products of individual probabilities. Thus equation 1 becomes:

$$P(C = \text{true} \mid R_1 = r_1, \ldots, R_N = r_N) = \\ \frac{P(R_1 = r_1 \mid c = \text{true}) \ldots P(R_N = r_N \mid C = \text{true})P(C = \text{true})}{P(R_1 = r_1 \mid C = \text{true}) \ldots P(R_N = r_N \mid C = \text{true})P(C = \text{true}) + P(R_1 = r_1 \mid C = \text{false}) \ldots P(R_N = r_N \mid C = \text{false})P(C = \text{false})} \quad \text{Equation 2}$$

Note: all the probability components: $P(C=true)$, $P(R_i=r_i|C=true)$, $P(R_i=r_i|C=false)$, where i is between 1 and N, can be estimated by simply counting the corresponding frequencies in the training data or by taking the corresponding complements.

The first probabilities calculated according to equation 2 may have a margin of uncertainty. When there is little data at the start, this margin will be large. It will decrease over time as more data is gathered.

It will be appreciated from the foregoing that absent any historical or other training data the rules module 201 may operate according to the hard rules and output a binary decision for example. The rules module may be configured to switch to providing a soft output, e.g. a probability, after it has received sufficient correctly classified calls on which to determine probabilities with useful certainty. Only a small number of correctly classified data records are required since the margin of error may be taken into account to ensure that the first probabilities do not perform worse than the hard rules, or binary decisions, in classifying data records, e.g. calls. Overall, according to some embodiments of the invention, the performance of the hard rules alone is used as a baseline, or minimum performance.

As discussed in connection with FIG. 2, the arbitration strategy may arbitrate between probabilities output by the rules module 201 and the probabilistic module 204. It can also be desirable to ensure that the output of the arbitration module does not perform worse than the hard rules alone. A rules module 201 configured according to some embodiments of the invention may be configured such that when there is a large margin of uncertainty, underestimating the correctness of a rule is avoided. Such underestimating may lead for example to the arbitration module favoring a weak probabilistic model 205 used in the probabilistic module 204 and consequently resulting in performance worse than the hard rules alone. This may be done by suitable biasing of the output of the rules module 201, either in the module itself or as part of an arbitration process implemented in the arbitration module 207.

The first probability output from the rules module may be determined as the result of a second, or soft, rule biased towards the upper confidence bound.

In a specific example the output of the rules module may be generated according to one or both of the following criteria:

Optimism about the rules' call reason assignment, meaning that it is trusted it with full confidence unless proven otherwise.

The more times a rule has fired, the greater the confidence that the calculated probability of a call reason according to the rules is correct.

The upper confidence bound (UCB) of the call reason probability determined using the rules may be used in the determination of the first probability. When there is little data the rules module may overestimate the correctness of the rules and as more data is gathered it may arrive at a more accurate value. Thus according to some embodiments of the invention, the first probability is the sum of a calculated probability derived using the correctly classified data records and a biasing factor, e.g. the standard error. Thus the first probability is biased towards the upper confidence bound of the calculated probability value.

The UCB, denoted $S_{RULES}$, can be calculated by:

$$S_{RULES} = \text{calculated probability} + \text{standard error} \quad \text{Equation 3}$$

This can be done using the standard error of the estimate of the mean for a binomial distribution:

$$\text{standard error} = \sqrt{\frac{p(1-p)}{n}}, \quad \text{Equation 4}$$

where: p is the observed rate at which the rule has correctly predicted the call reason and n the number of observations used to calculate this rate.

This can be calculated by substituting $P(C|R_1, \ldots, R_N)$ for p and the number of observations in the training data for n. The UCB values for each call reason may then be the values output by the soft rules module for each call and each call reason or category.

In the case when no rules fire, and following the criteria stated above, the original rules' prediction may be supported. Therefore, the standard error may be subtracted in order to favor a negative categorization. Thus according to some embodiments of the invention, the first probability is a calculated probability derived using the correctly classified data records minus a biasing factor, e.g. the standard error. Thus the calculated probability may be biased towards the lower confidence bound of the probability value.

The complete process which may be implemented in the rules module 201 may be summarized as follows:

Stage 1: Output Bayesian Probabilities
  For each correctly classified call, record which rules fired, together with actual call reasons.
  Compute the posterior probability of the category being assigned given the fired rules, as shown in Equation 2.
  Rules module 203 returns these values (instead of 1 or 0 which would result from hard rules)

Stage 2: UCB Rule Scoring algorithm
  Calculate standard error of the output of stage 1. This is the confidence measure.
  Rule output:

$$S_{RULES} = P(C|R_1, \ldots, R_N) + \text{confidence measure} \quad \text{Equation 5}$$

This mechanism ensures when there is doubt, the output of the rules module 201 is used in preference to the output of the probabilistic module 204 and helps prevent performance dropping below that of the hard rules alone. It will be appreciated that some of the operations described for ensuring that the baseline hard rules' performance is reached may be carried out in the arbitration module 207 instead of in the rules module 201.

Figure 4:
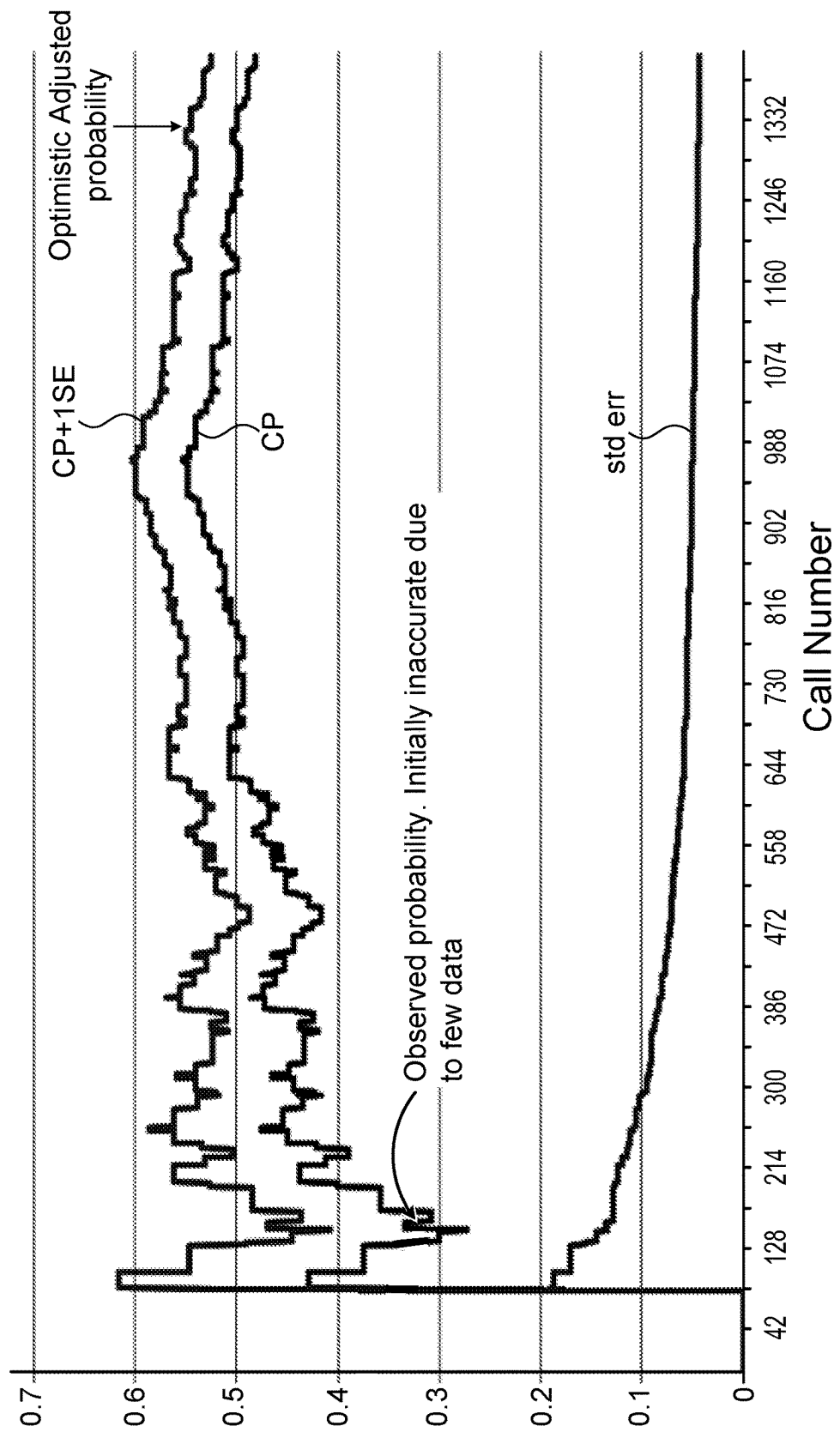
FIG. 4 is a graph showing a simulation of the UCB Rule Scoring Algorithm for a single rule and a single call reason according to some embodiments of the invention.

FIG. 4 shows a simulation of an UCB Rule Scoring Algorithm for a single rule and a single call reason, illustrating for example how the uncertainty of the observed probability of the rule being correct decreases over time. In this simulation the actual probability of the reason being correct given the rule fires is 0.5. The middle line shows the observed performance or cumulative probability, CP, over time, the lower line shows the standard error and the upper line shows the optimistic adjusted probability, or observed performance plus one standard error. On the left, with few data points, there is considerable uncertainty in the observed value as indicated by the standard error. As the system observes more data this decreases. This biasing towards the upper confidence bound prevents underestimating the rules' performance on little data.

Probabilistic Models Module

The probabilistic module 204 can use a set of probabilistic models 205, for example producing one prediction per possible category, e.g. call reason. To train these models 205 training data may be split up into different sets, one for each call reason, and a model for each may be built. Each model can be any model that produces a probability or approximation to a probability. Examples of models include models based on any of linear regression, logistic regression, decision tree, random forest, neural network, support vector machine and Bayesian networks.

At scoring time, e.g. during a process of categorization, each model may be scored and a set of probabilities, one for each call-reason, is output. This may be termed the confidence score for each category $S_{ML}$.

The probabilistic models 205 may be trained on a dataset produced by extracting features from the logged calls. The raw data in the dataset may include, although is not limited to, agent free text notes made during the call and system-generated codes made when certain actions are performed by an agent.

To create a set of features from the agent notes, or for example speech converted into text which may form part of a call record, there are many standard automatic text-processing techniques that could be used, familiar to one skilled in the art. A very simple method may:

Create a bag of words from a large set of agent notes
  Remove common stop words such as: "the", "a", "is", etc.
  Stem the remaining words. This reduces inflected or derived words to their base or root form. For example: paid, pays and pay would all become pay.
  Remove top and bottom most frequently occurring words (for example those occurring in more than 80% or less than 1% of agent notes). Words that occur in almost all or almost no agent notes may not be useful to discriminate between different call reasons.

This may result in a set of several hundred words. From this it is possible to automatically create a set of binary features in which the value of each is determined by the presence or absence of each word within an agent note.

The system generated codes can similarly be encoded into a set of binary features.

The probabilistic models 205 may use any combination of the features for each category. In contrast to the rules used in rule engine 203, according to some embodiments of the invention, the probabilistic models 205 are not limited to any predetermined features and may be based on any combination of features extracted or otherwise discovered in the data record relating e.g. to a call. A probabilistic model may relate at least two different features to a category, e.g. call reason, and take account of and possibly learn from the relative importance of those different features. In a rule the input features may be combined in a predefined way, for example as defined by the rule writer, e.g. if A and B and not C then Z. The writer may specify the relationship between features. A probabilistic model may explicitly learn these relationships (aX+by+cZ) where a, b and c are learned coefficients. Consequently, a probabilistic model can combine input data in complex and unexpected ways.

According to some embodiments of the invention, both the rules module 201 and the probabilistic module 204 may be supplied with correctly classified data after they have commenced operation. This may be part of an ongoing process for example a manual process, in which an experienced individual may take a sample of the data records and classify them. This correctly classified data may be termed current data as opposed to historical data which may have been classified before the commencement of operation of a system or method according to some embodiments of the invention.

Correctly classified data may be used by the probabilistic models module to update the models as part of a machine learning process.

The current data may be used to allow for changing customer behavior or other data trends over time.

Arbitration Module

The arbitration module 207 according to some embodiments of the invention is configured to implement a strategy which may prescribe how to automatically combine or arbitrate between the predictions or probabilities output from the rules module 201 and the predictions or probabilities output from the probabilistic module 204. The strategy can be termed a combination model or arbitration model.

The combination or arbitration may be achieved in any number of ways. One possibility is to use an automated voting scheme. In an example of such a scheme a vote is positive if the probability is greater than or equal to a configurable threshold, T, (which may for example be 0.5), otherwise it is negative.

When the respective probabilities from the rules module 201 and the probabilistic module 204 agree the result, positive or negative, can be deemed to be correct. Then the data record, e.g. call, can be categorized or not according to the agreed result.

When the respective probabilities differ, an arbitration process may be implemented. In an example arbitration process according to some embodiments of the invention, the winner, or decision, negative or positive, is the one with the highest probability weighted by historical performance on the available data, and optionally further weighted according to distance from the predetermined threshold. A strategy of this kind can be represented mathematically as:

$$w_{RULES} = F_{1,RULES} f(S_{RULES})$$ Equation 6

$$w_{ML} = F_{1,ML} f(S_{ML})$$ Equation 7

Where: if $S > T$ for threshold $T$ $$f(S) = \frac{S - T}{1 - T}$$ Equation 8 else $$f(S) = \frac{T - S}{T}$$ Equation 9 and:
F1 is a standard performance metric known to those skilled in the art for classification representing historical accuracy. It is defined as the harmonic mean of precision and recall. According to some embodiments either of precision and recall may be used instead of the harmonic mean as a performance metric. It will be appreciated that a set of correctly classified calls may be used to measure the performance of any of the modules shown in FIG. 2 in categorizing calls.

Note: when T is not 0.5, the values S may be be scaled according to their distance or difference from the threshold, rather than taking their absolute values. The function $f(S)$ may be used to perform this scaling. Thus according to some embodiments of the invention, the historical performance is weighted by the proportionate distance from the threshold.

To choose the winning method $w_{RULES}$ may be compared with $w_{ML}$ for example:
if $W_{RULES} > W_{ML}$ then choose RULES output
else choose ML output.

Thus some embodiments of the invention may include one or more of the following features:
Conversion of binary decisions to probabilities using correctly classified data, either historical data or data classified after operation of classification has commenced.

Use of the upper confidence bound of probabilities resulting from the rules to take an optimistic view of the rules' performance, to ensure that when there is doubt between the trained probabilistic models and the rules the system preferentially selects the rule-generated category.

An arbitration mechanism that uses historical performance.

Some embodiments of the invention may lead to the following improvements over systems which use only hard rules:

The hard rule set will not need to be complete and highly tuned before a categorization system or method goes live. A method or system according to some embodiments of the invention can initially be implemented with a basic set of rules. A system could then start to tune itself, e.g. learn, with performance improving especially over the initial period.

The use of probabilistic models may lead to an improvement in performance over time compared to using hard or soft rules alone, however the benefit of rules may be realized for the initial period during which a probabilistic model may not have had sufficient training.

Some call reasons may be very difficult to determine with rules alone. If any such call reasons are common for a particular client then without the invention performance will be poor regardless of the amount of tuning, or learning.

A possible context for use of some embodiments of the invention will now be described in more detail with reference to FIGS. 5 to 14. These figures show example architectures comprising individual processing modules and data repositories and operations which they may perform. Each module may comprise for example software being executed on a processor or multiple processors, and multiple modules may be executed on a single processor. Thus for example any of the modules shown in FIGS. 5-14 may be implemented in a multi-core central processing unit. Similarly the data repositories may comprise any number of storage devices in which one or more of the indicated repositories are combined or distributed across multiple storage devices.

Figure 5:
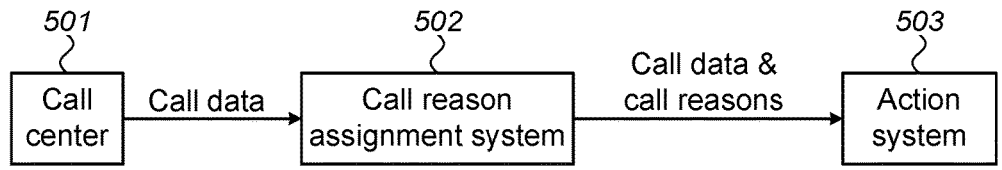
FIG. 5 is a basic block diagram showing possible interaction between a call reason assignment system with a call center and an action system according to some embodiments of the invention.

A typical usage scenario is illustrated in FIG. 5. A typical example of usage of some embodiments of the invention may be in a call reason assignment system 502 to process call data, e.g. data records relating to a call, after a call is made to a call center 501. Thus the architecture illustrated with reference to FIG. 2 may be implemented in the call reason assignment system 502, which may comprise any number of computers or data processing apparatus. According to some embodiments of the invention, the call reason assignment system 502 may comprise a server, e.g. a computer or set of computers that provide services to other computers, the other computers for example belonging to the call center 501 and an automated action system 503. The resulting category, e.g. call reason assignment, may be forwarded to the action system 503, and may be used to trigger an automated action appropriate to the call reason. FIG. 5 shows where a call reason assignment system 502 might be located in relation to a call center 501 and an action system 503. The call reason assignment system 502 and the action system 503 may or may not be part of the call center 501. The action module 209 of FIG. 2 may be part of the action system 503.

According to some embodiments of the invention, the call reason assignment system 502 may be configured with any of:

A set of possible categories, e.g. call reasons. This might typically be between 10 and 25 but could be any number, for example: payment, payment arrangement, billing, etc.

A set of call reason assignment rules. These could be of the form: if <some condition X> then <add call reason Y>. Typically there may be 50 to 100 rules.

A set of features that the rules module 201 and the probabilistic module 204 may use. These could for example simply be a set of binary features denoting the presence or absence of any relevant machine generated codes and the presence or absence of various keywords in the agents notes.

A threshold, T. This is the threshold probability which may be used to determine whether a predicted call reason is included in the output. The higher this value is set, the fewer the number of call reasons assigned. Those that are identified can be assumed to be more accurate but this accuracy is achieved at the expense of possibly missing many possible categorizations of calls. The lower this value is set, the greater the number of call reasons assigned. The system will pick up more of the harder to identify call reasons but at the expense of many false positives. A typical value for the threshold might be 0.5.

Figure 6:
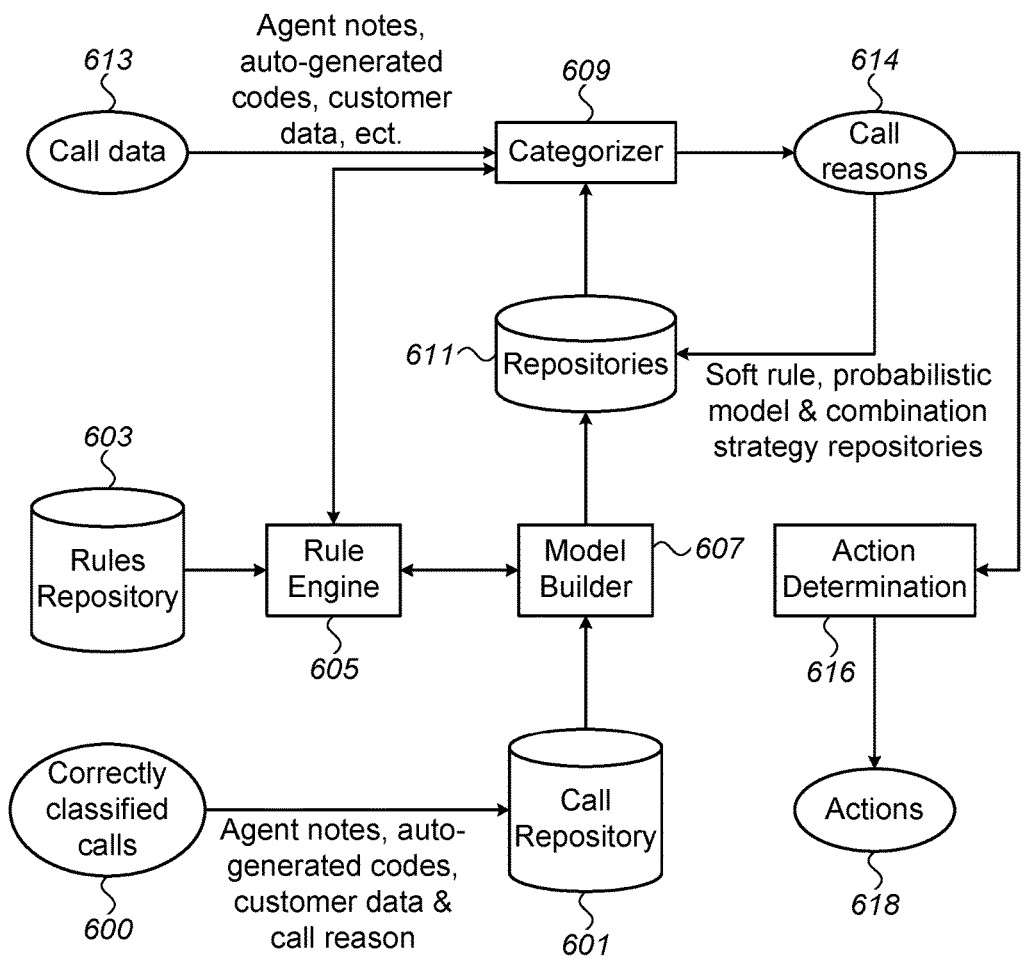
FIG. 6 is a block diagram showing major components of a call reason assignment system according to some embodiments of the invention.

FIG. 6 shows the major components of a call reason assignment system according to some embodiments of the invention. These are:

A call repository 601—call data 600, for example in the form of data records relating to respective correctly classified calls, may be stored here along with their correct call reason assignments to be used as training and/or performance measurement data.

A rules repository 603—the hard rules configured in a system may be stored here.

A rule engine 605, for example of the kind described with reference to FIG. 2. This module may retrieve the hard rules from the rules repository 603 and execute them, for example to produce a binary output, 1 or 0 for each rule and each call indicating which rule has fired. The hard output may be provided to the categorizer 609 for example as described further with reference to FIG. 11. The categorizer 609 may accept call data and return a list of call reasons from the rules that have fired.

A model builder 607 described in more detail with reference to FIG. 7, may periodically rebuild any of the probabilistic models, conditional probabilities and other parameters, such as the metric F1 or other historical metric, required for a categorizer of the kind shown in FIG. 2.

A categorizer repository 611 may store the soft rules, probabilistic models and arbitration strategy used by a categorizer.

Figure 11:
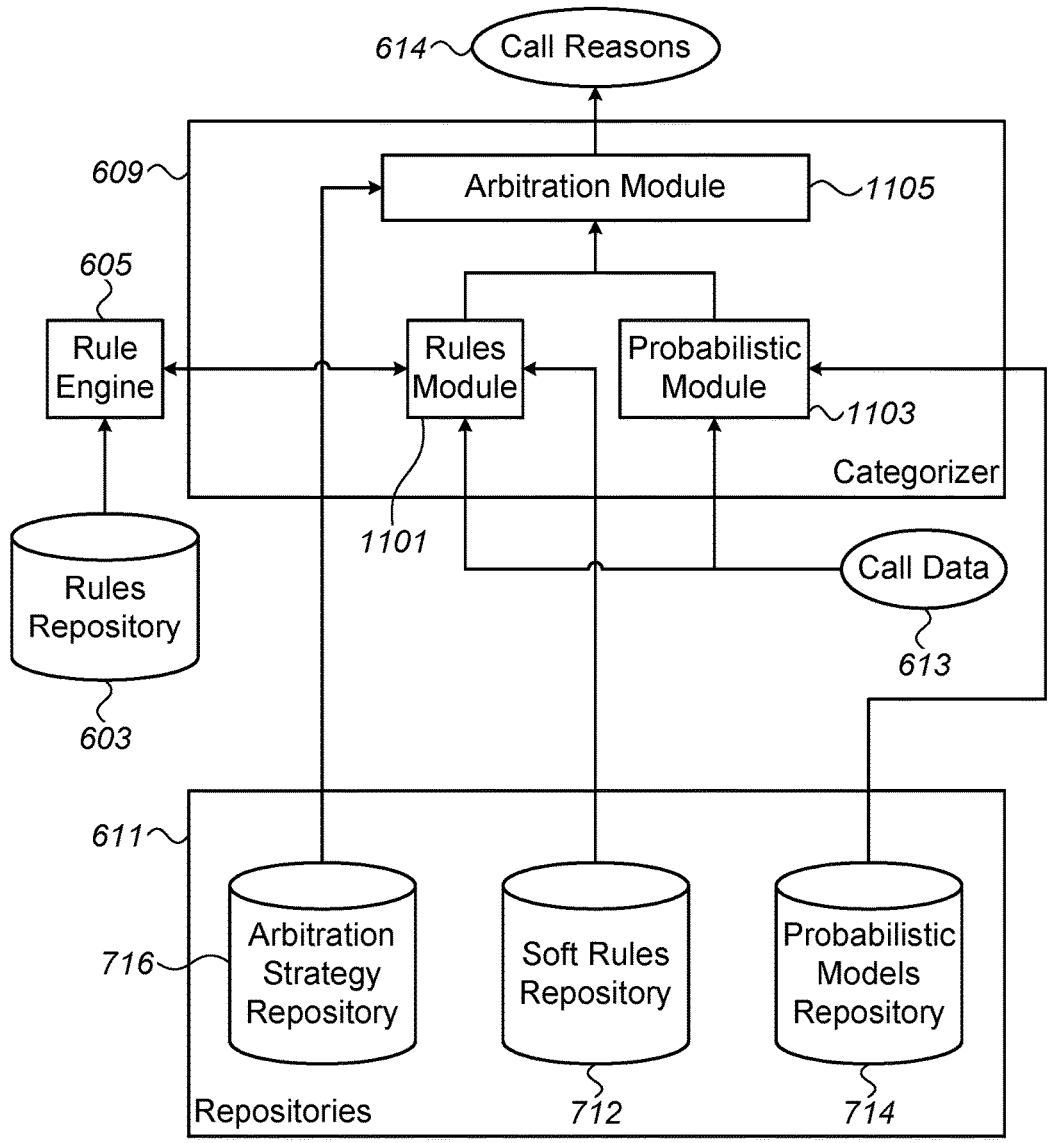
FIG. 11 is a block diagram showing major components of a categorizer according to some embodiments of the invention.

A categorizer 609 similar to that shown in FIG. 2 with relationships to other modules shown in more detail in FIG. 11, may receive as input data records, e.g. call data 613, and use the rule engine 605 along with any of the soft rules, probabilistic models and arbitration strategy stored in repository 611 to assign call reasons to call data and to output the call reasons 614. The call reasons may also be fed back to the repositories for the purpose of performance monitoring.

An action determination module 616 configured to receive the call reasons 614 and to initiate actions appropriate to the call reasons, for example by outputting action instructions 618 to be implemented in other parts of a system according to the invention. For example if a caller has called to inquire about a refund, a flag may be set to ensure that the refund has been actioned. If the caller has a complaint, a follow up email might be appropriate, to ensure that the complaint has been resolved.

Figure 7:
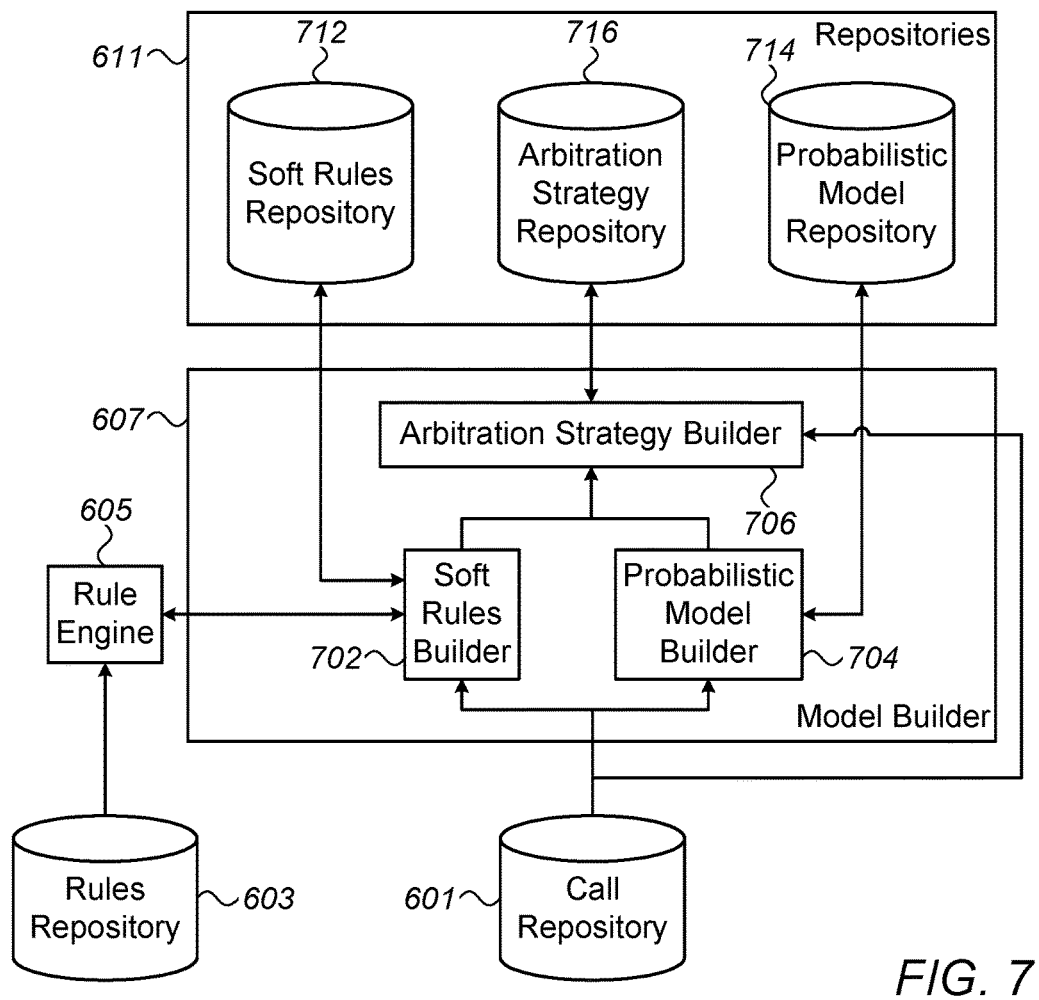
FIG. 7 is a block diagram showing major components of a model builder according to some embodiments of the invention.

An example model builder 607 according to some embodiments of the invention is shown in more detail in FIG. 7. Some components shown in FIG. 6 are included in FIG. 7 and others are omitted for the sake of clarity. The model builder 607 is shown as comprising modules 702, 704 and 706, for building the soft rules, the probabilistic models and the arbitration strategy respectively. The soft rules builder 702 and the probabilistic model builder 704 according to some embodiments of the invention are configured to receive data records in the form of correctly classified calls from the call repository 601 and to use these to build the rules and the models which may be then used to build the arbitration strategy.

Data input to the soft rules builder 702 according to some embodiments of the invention may include an indication as to which rule has fired for each of the correctly classified calls. This may be included as part of the call data stored in the call repository 601. However the provision of the indication in this way may not accommodate changes made to the hard rules. Thus according to some embodiments of the invention the determination as to which rule has fired is done by the rule engine 605. Thus the soft rules builder 702 may retrieve a call, e.g. a data record relating to a call, from the call repository 601. The soft rules builder 702 may then send the retrieved call data to the rule engine 605 where the rules are applied to the call. The soft rules builder may then use the call data and the output of the rule engine to determine the probabilities, for example as defined in equation 2.

Each of the modules 702, 704 and 706 may be configured to provide its built output to a respective repository 712, 714, and 716 in repository 611. The arbitration strategy repository may be used to store call reasons output from the categorizer 609 for use in performance monitoring.

Figure 8:
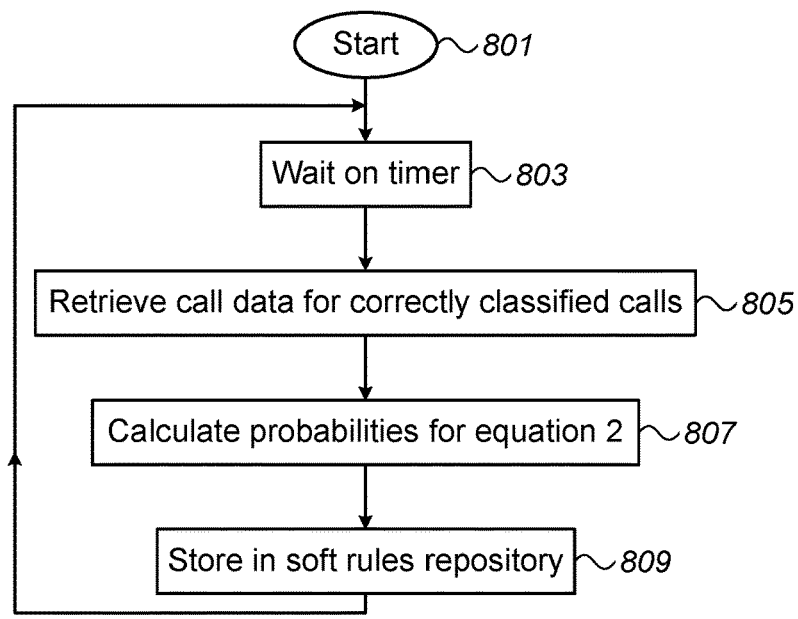
FIG. 8 is a flow chart showing operations that may be performed in a soft rules builder according to some embodiments of the invention.

FIG. 8 is a flow chart showing a process that may be implemented in the soft rules builder 702 according to some embodiments of the invention. In the example of FIG. 8, after start up at operation 801, the builder is waiting on a timer at operation 803 to commence operation. At the correct time, e.g. clock cycle, at operation 805 data records for training purposes are retrieved from the call repository 601. According to some embodiments of the invention all of the correctly classified training records are retrieved, leaving those that are used for performance monitoring discussed further in connection with FIG. 10. According to other embodiments of the invention a start date or time may be applied so that the oldest training records are not retrieved. Then at operation 807 the retrieved data records may be used to calculate or determine the probabilities specified in equation 2, namely the probabilities required for calculation of the probability of each call reason given that certain rules fire and other do not. The operations of FIG. 8 may be performed periodically, for example nightly.

These probabilities may then be stored in the soft rules repository 712 at operation 809 to be able the determination of call reasons from call data quickly and efficiently. Thus for example at run time, a binary output from the rule engine 605 may be modified using the probabilities stored in the soft rules repository to determine the first probability that is output from the rules module 201. The process of the example of FIG. 8 returns to waiting on a timer at operation 803. The process may run periodically either using all correctly classified training calls available, or a selection such as those from a particular start date. At each next iteration of operation 807 the probabilities may change since more data, or more recent data, or both may be used.

Figure 9:
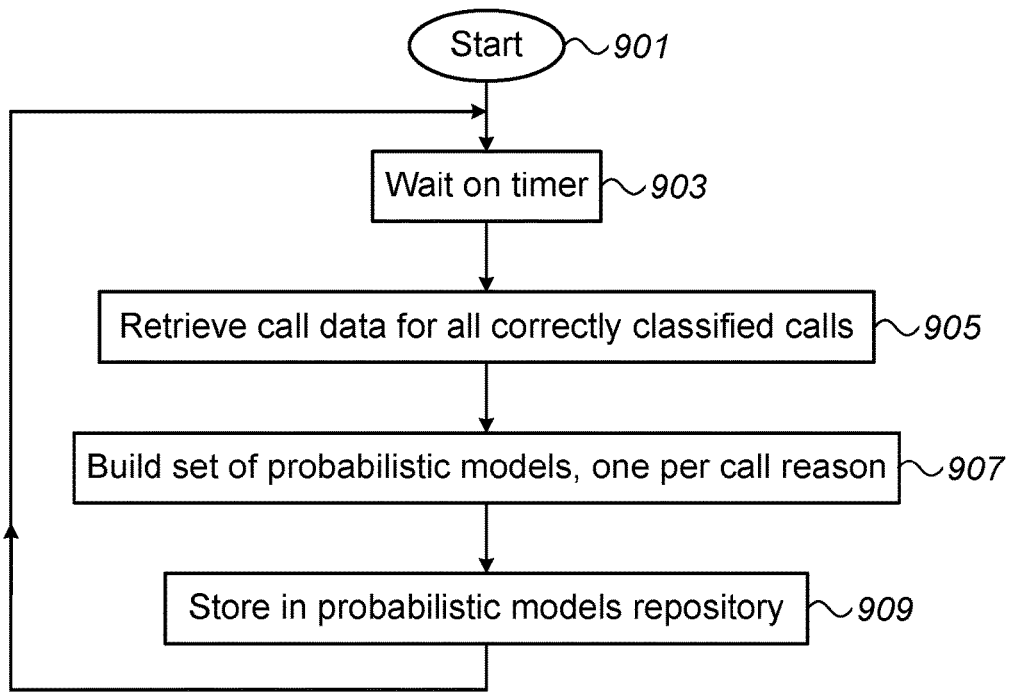
FIG. 9 is a flow chart showing operations that may be performed in a probabilistic model builder according to some embodiments of the invention.

FIG. 9 is a flow chart showing a process that may be implemented in the probabilistic model builder 704 according to some embodiments of the invention. After start up at operation 901, in the example of FIG. 9 at 903 the builder 704 is waiting on a timer to commence operation. At the correct time at operation 905 training data records are retrieved from call repository 601. Then at operation 907 a set of probabilistic models is built, or previous models are modified, to estimate the probability of a data record belonging to a particular category, e.g. a call being made for a particular call reason. Operation 907 may involve the model builder 704 obtaining or receiving previously extracted features from the data records. Alternatively the model builder 704 may itself perform the feature extraction. Either way, the model builder according to some embodiments of the invention uses the features and a set of correctly classified records to derive at least one probabilistic model estimating the probability of a data record belonging to a category according to which of the extracted features are present in the data record. The set of built models may then be stored in the probabilistic model repository 714 at operation 909 and the process reverts to operation 903 to await the next iteration.

As with the process of FIG. 8, the process of FIG. 9 may run periodically using either all correctly classified training call data or a selection of that data to predict the probability of a particular call having a given call reason. According to some embodiments of the invention there may be one model built for each possible call reason. Any modelling technique that calculates a probability or approximates to a probability can be used.

Figure 10:
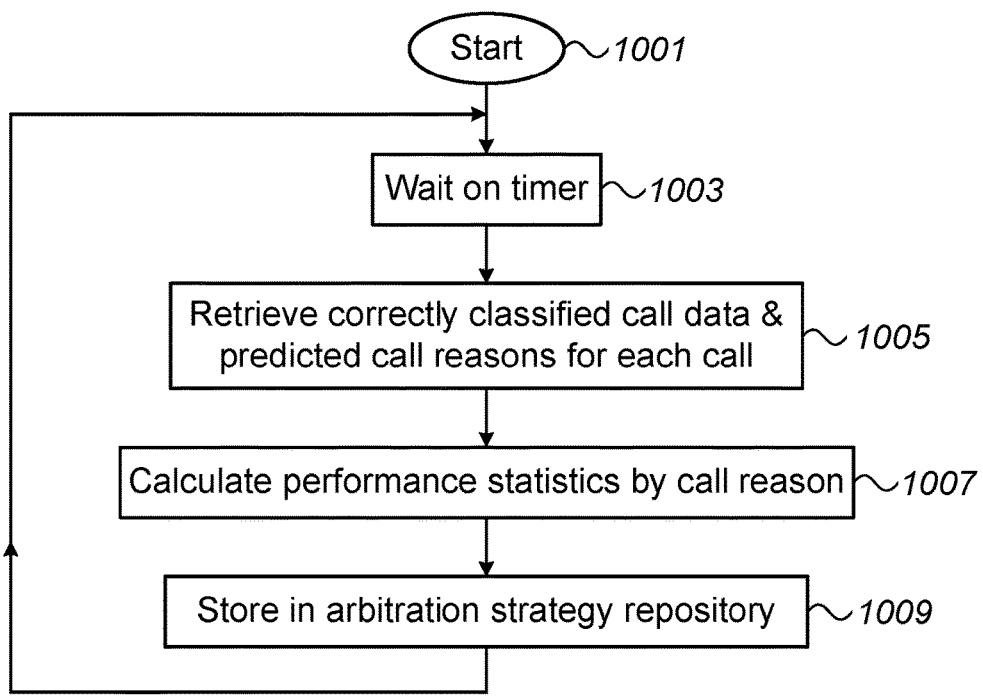
FIG. 10 is a flow chart showing operations that may be performed in a arbitration strategy builder according to some embodiments of the invention.

FIG. 10 shows a process that may be implemented in the arbitration strategy builder 706 according to some embodiments of the invention. Generally, the arbitration strategy builder in this illustrative embodiment is configured to determine a metric, for example F1, of the accuracy of the first and second probabilities respectively in determining whether a data record belongs to a category. This determination of performance metric may be done using a set of correctly classified data records. The determination may be repeated to update the metrics, for example at regular intervals, using new correctly classified data records. Referring to the example of FIG. 10, after start up at operation 1001, at 1003 the builder 706 is waiting on a timer to commence operation. At the correct time at operation 1005 data records are retrieved from call repository 601. In contrast to the soft rules builder 702 and the probabilistic model builder 704, the data records retrieved by the arbitration strategy builder 706 from the call repository 601 are a set of data records reserved for performance monitoring. In addition the arbitration strategy builder receives predicted call reasons for each of the retrieved correctly classified calls.

In operation 1007, the predicted call reasons are compared with actual call reason and performance metrics are calculated, for example F1, for each call reason for each of the rules module 201 and the probabilistic module 204. The performance metric can be any preferred metric. In the example of equation 6 $F_1$ was used. Other possibilities include recall, or precision or any other metric known to those skilled in the art. At operation 1009 the set of performance metrics calculated at operation 1007 is stored in the arbitration strategy repository 716, and the process reverts to operation 1003.

This process may run periodically using all or a selection of those correctly classified calls reserved for performance monitoring together with the predictions made by the Soft Rules Models and Probabilistic models for each call.

FIG. 11 shows a categorizer 609 according to some embodiments of the invention, also shown in FIG. 6, in more detail. This module comprises modules, or sub-modules, namely a soft rules module 1101, a probabilistic module 1103 and an arbitration module 1105. The categorizer 609 may listen for incoming call data 613. This data 613 may be received through a well specified application programming interface, "API", and may contain structured data in the form of machine generated codes from a call resolution process as well as free text in the form of agent notes or speech converted into text. The structured data and the agent notes or other text may be pre-processed to identify previously configured features, and optionally use them to create a features vector. The identified features, for example in the form of a features vector, may be used by the soft rules module 1101 applying the soft rules from the soft rules repository 712 to produces a set of first probabilities, for example one for each call reason identified by the rules. The soft rules module 1101 may determine the probabilities with the aid of the rule engine 605 in the same manner that the soft rules builder 702 may determine the probabilities with the aid of the rule engine 605. A vector of the identified features may be consumed by the probabilistic module 1103 applying the probabilistic models from the repository 714 to produce a set of second probabilities, one for each possible call reason. The arbitration module 1105 may then use the first and second probabilities for each category to determine whether or not a call belongs to a particular category. The arbitration module may do this by applying an arbitration strategy and the metrics stored in the arbitration strategy repository 716 to arbitrate between any differences in the first and second probabilities.

Figure 12:
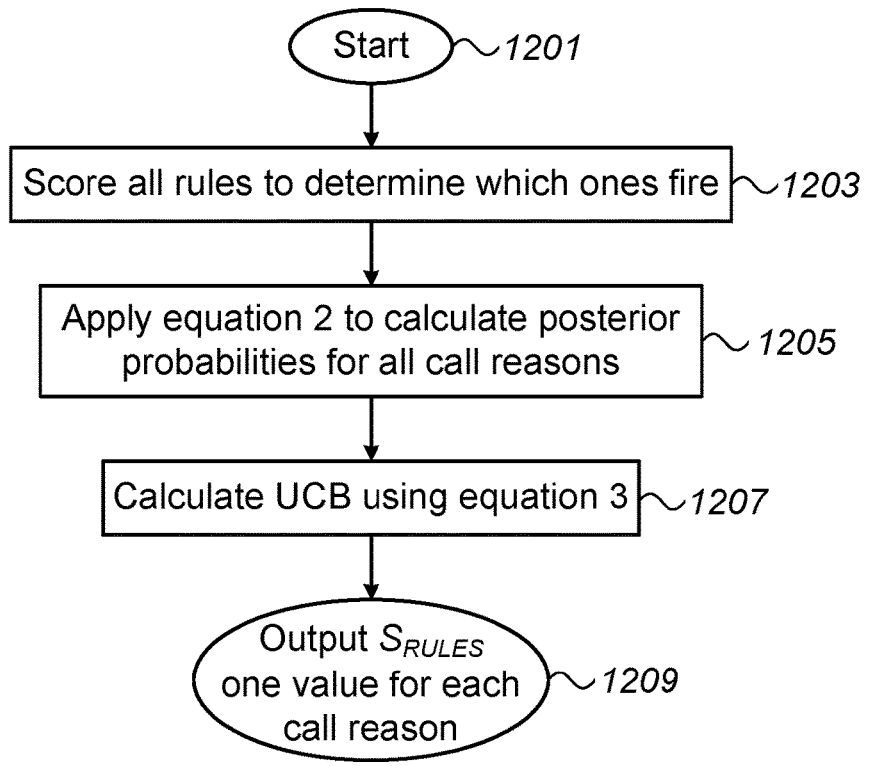
FIG. 12 is a flow chart showing operations that may be performed in a soft rules module according to some embodiments of the invention.

FIG. 12 shows a series of operations that might be performed according to some embodiments of the invention by the soft rules module 1101 to provide a first probability, or score, indicating whether a data record belongs to a category, e.g. a call to which the record relates was made for a particular reason. After start up at operation 1201, the illustrated process accepts a data record, for example relating to a single call. At operation 1203 a score, e.g. in binary form, is given to all of the rules depending on which fired, e.g. whether the data record has the one or more features mentioned in the respective rule. This may be done by executing the rules on a feature vector as described with reference to FIG. 11. At operation 1205 the set of rules that fired may be fed into equation 2 to calculate a first probability for each category, e.g. a posterior or predicted probability for all possible call reasons. In this illustration, first the rules are executed on this feature vector. At operation 1207 a confidence measure may be calculated for each of the first probabilities. This can simply be the standard error of the probabilities, as detailed in equation 4. Finally, at operation 1209 a first probability, $S_{RULES}$, may be output for each call reason to the arbitration module 1105.

Figure 13:
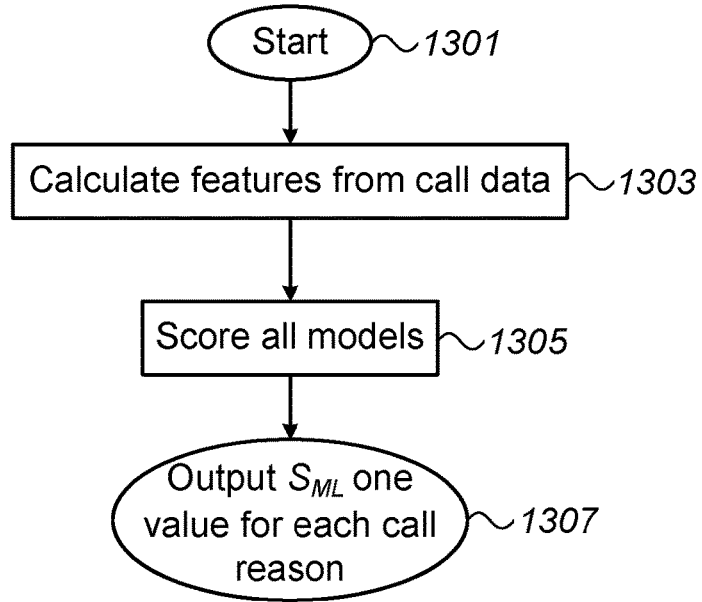
FIG. 13 is a flow chart showing operations that may be performed in a probabilistic models module according to some embodiments of the invention.

FIG. 13 shows a series of operations that may be performed according to some embodiments of the invention by the probabilistic module 1103 to provide a second probability, or score, indicating whether or not a data record, e.g. call data, belongs to a category, e.g. whether a call was made for a particular reason. The operations of FIG. 13 may be performed on each data record. After start up at 1301, the first operation 1303 is to determine what features are present in the data record or call data, following which at operation

1305 all models, e.g. one for each category, are scored against the set of features, for example in the form of a vector, to produce a score or second probability for each category, e.g. call reason. Finally at operation 1307 the second probabilities, $S_{ML}$, may be output to the arbitration module 1105.

Figure 14:
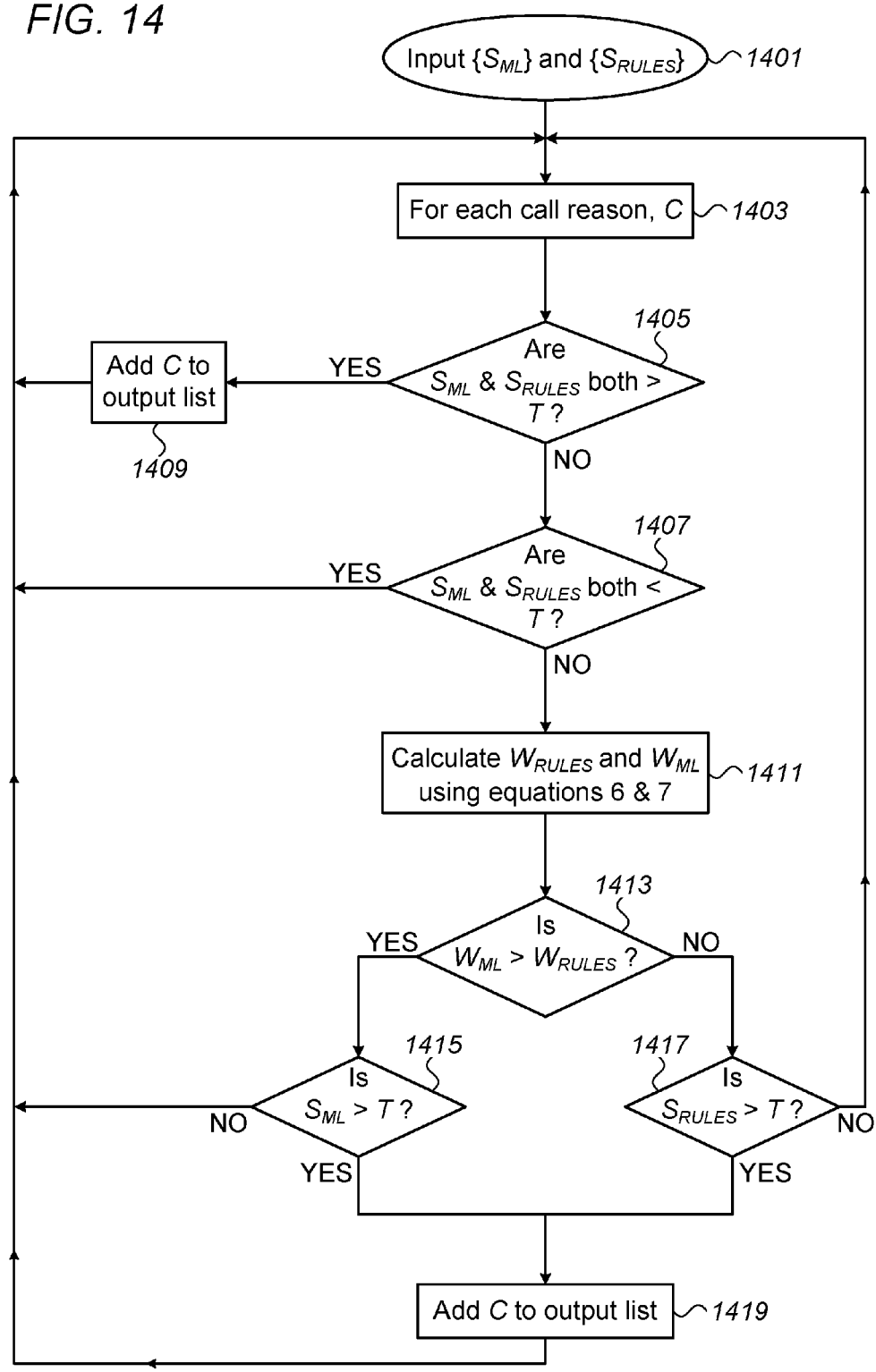
FIG. 14 is a flow chart showing operations that may be performed in a arbitration module according to some embodiments of the invention.

FIG. 14 shows a series of operations that may be implemented in the arbitration module 1105 using an arbitration strategy. The probability scores for each possible call reason from each module which may be denoted by two vectors $\{S_{RULES}\}$ and $\{S_{ML}\}$, form the input received at operation 1401. At operation 1403 the system will start to evaluate each call reason in turn. At operations 1405 and 1407 the $S_{ML}$ and $S_{RULES}$ values are compared to a threshold T. The threshold T can be set at any value but typically it will be around 0.5. If both first and second probabilities for a particular call reason are found to be greater than threshold T at operation 1405 then that call reason is assigned to the call, as shown in operation 1409. If both predictions for a particular call reason are found to be smaller than threshold T at operation 1407, then that call reason is not assigned to the call and the flow returns to operation 1403 to recommence with a new call reason. If one prediction is above the threshold and the other below then the arbitration strategy must arbitrate using $W_{RULES}$ and $W_{ML}$ calculated from equations 6 and 7 in operation 1411. This may be is done by comparing the historical performance of each scoring mechanism on that call reason. The scoring mechanism with the greatest accuracy (determined, for example by F1), weighted by the distance from the threshold using equations 8 and 9, may be taken to be the accepted probability. This logic is shown in operations 1413, 1415, and 1417. If this probability is greater than the threshold then the call may be added to a list of calls with that reason at operation 1419. If not, it may be assumed that the call does not belong to that category/call reason and it is not added to the list.

FIGS. 15-18 show the results of running a simulation of a method according to some embodiments of the invention built on real customer data of about 2700 calls. The simulation starts with only a set of rules. At each step of the simulation the system receives a new batch of about 220 correctly classified calls for training purposes and the results tests on a held-out batch of about 500 calls for performance monitoring. Each plot shows performance of the system over time (10 steps). The straight line represents the performance of the hard rules alone, e.g. the performance of the output from rules module 201 or 1101. As the rules do not change over time, this stays constant in the simulation. The line which starts below the straight line represents the performance of the probabilistic models alone, e.g. the performance of the output from probabilistic module 204 or 1103. As more correctly classified calls are received the performance will generally increase. The third line represents the performance of the complete system, e.g. the performance of the output from the arbitration module 207 or 1105. This should never decrease below that of rules alone and increase as more correctly classified calls are received. There were 29 possible call reasons. The chosen performance metric in this simulation is F1.

Figure 15:
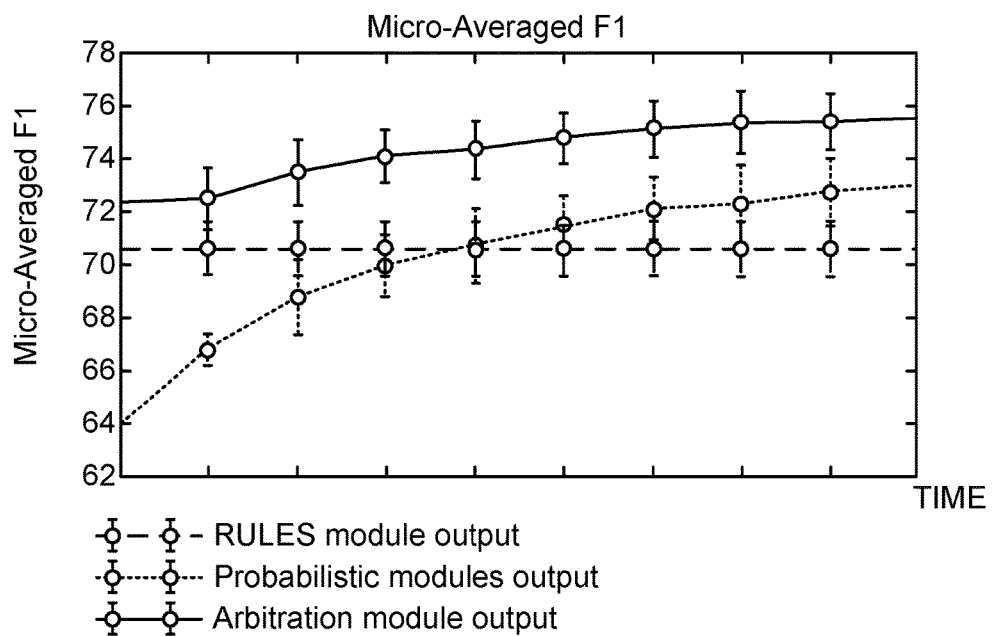
FIG. 15 is a graph resulting from a simulation of methods according to some embodiments of the invention, showing overall performance.
Figure 16:
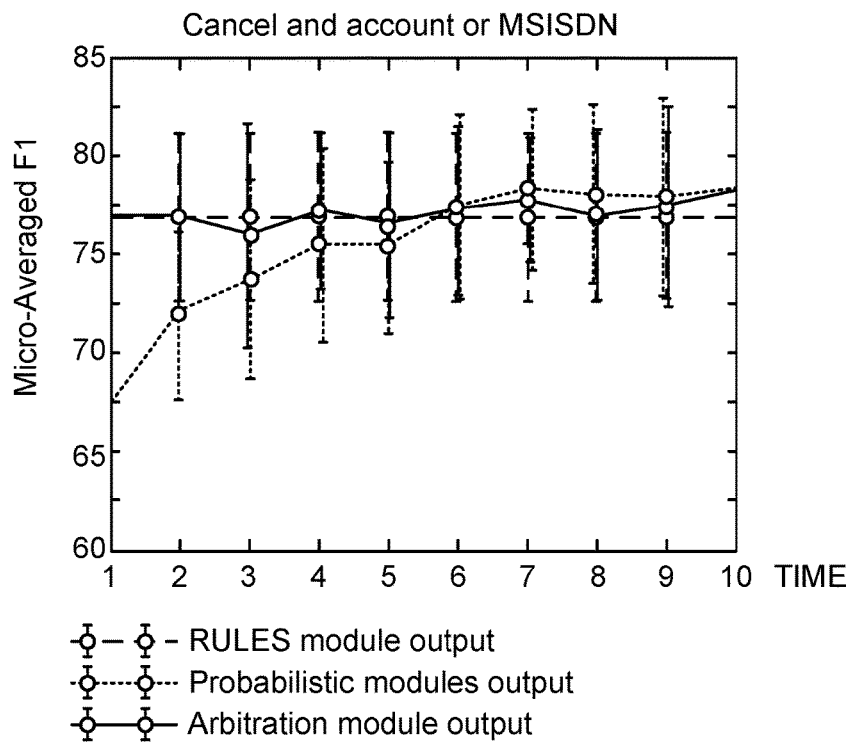
FIGS. 16, 17 and 18 are graphs similar to FIG. 15 showing performance on different single call reasons according to some embodiments of the invention.
Figure 17:
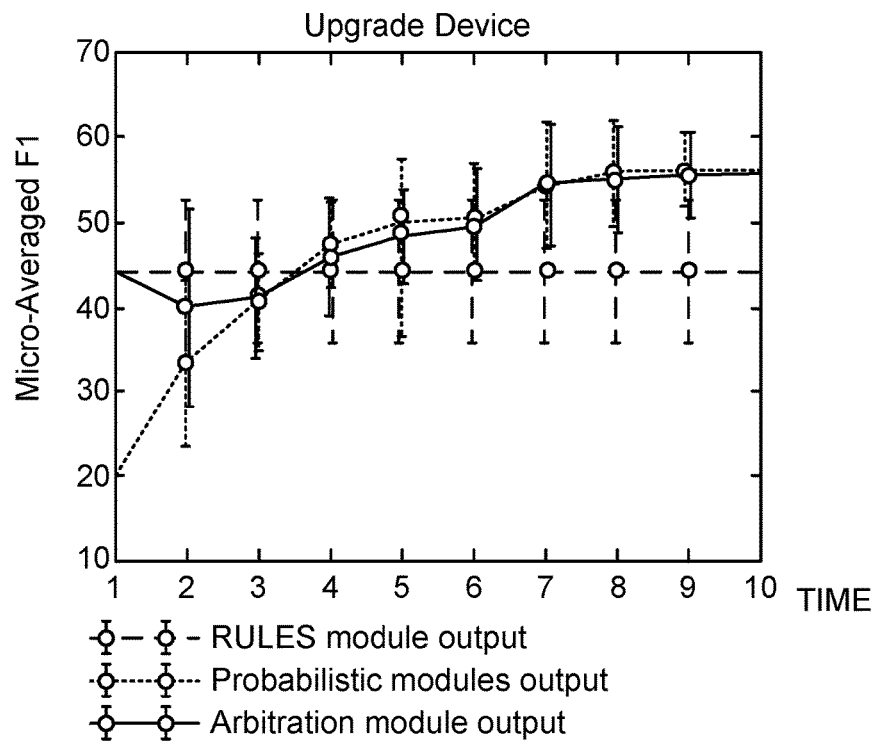
Figure 18:
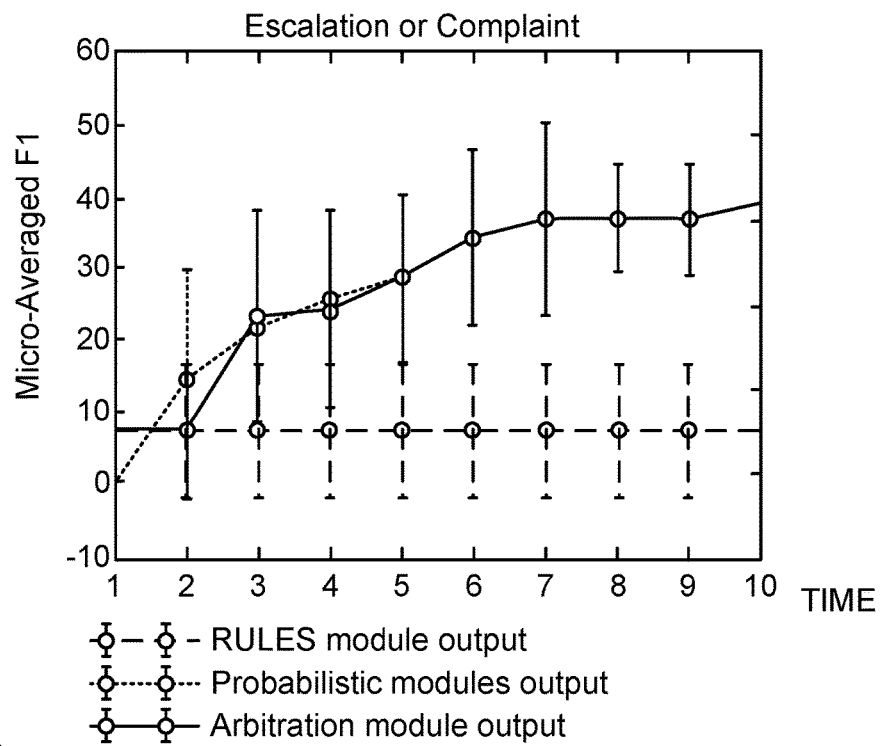

FIG. 15 shows the overall performance of the system. There is clear uplift over and above the rules alone. Inspection of individual call reasons gives some indication of how the uplift demonstrated in FIG. 15 is being obtained. FIG. 16 shows performance on a single call reason, in this case cancellation of an account. FIG. 16 illustrates a call reason where the rules are performing well. The probabilistic models struggle to reach the same level of performance and combined system performance hovers around that of rules alone. FIG. 17 illustrates a single call reason—upgrade device. This is an example of a call reason where the probabilistic models initially produce poor results and the overall system gives a performance similar to the rules (within the region of uncertainty denoted by the error bars). As more correctly classified calls are received the overall performance starts to diverge from the rules alone and increase with the probabilistic models. FIG. 18 shows a single call reason—complaint. This is an example a call reason where the rules perform very poorly. Almost straight away the probabilistic models start to show a large improvement.

Figure 19:
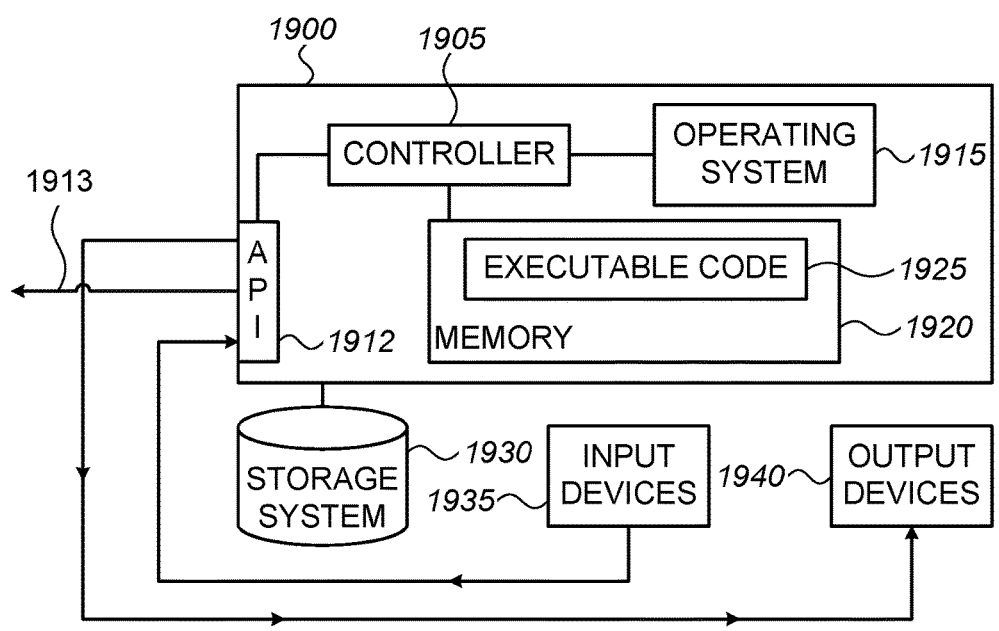
FIG. 19 is a high level block diagram of an exemplary computing system according to some embodiments of the present invention.

Reference is made to FIG. 19 showing a high level block diagram of an exemplary computing system 1900 according to some embodiments of the present invention, for example for use in systems according to some embodiments of the invention. For example, the call reason assignment system 502 or other computing devices carrying out all or part of some embodiments of the present invention may include components such as those included in computing system 1900. Computing system 1900 may comprise a single computing device or components, alternatively functions of system 1900 may be distributed across multiple computing devices. Computing system 1900 may include one or more controllers such as controller 1905 that may be, for example, a central processing unit processor (CPU), a chip or any suitable processor or computing or computational device, an operating system 1915, a memory 1920 including an executable code segment 1925, storage 1930, input devices 1935 and output devices 1940. For example, call reason assignment system 502 may include one or more controllers similar to controller 1905, one or more memory units similar to memory 1920, and one or more executable code segments similar to executable code 1925. One or more processors in one or more controllers such as controller 1905 may be configured to carry out methods according to some embodiments of the invention. For example, controller 1905 or one or more processors within controller 1905 may be connected to memory 1920 storing software or instructions that, when executed by the one or more processors, cause the one or more processors to carry out a method according to some embodiments of the present invention. Controller 1905 or a central processing unit within controller 1905 may be configured, for example, using instructions stored in memory 1920, to perform the operations shown in any of FIG. 8-10, 12 or 13. Any of the repositories 712, 714, 716, may comprise storage such as storage 1930.

Operating system 1915 may be or may include any code segment designed and/or configured to perform tasks involving coordination, scheduling, arbitration, supervising, controlling or otherwise managing operation of computing system 1900, for example, scheduling execution of programs. Operating system 1915 may be a commercial operating system. Memory 1920 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 1920 is a transitory or non-transitory processor-readable storage medium that stores instructions and the instructions are executed by controller 1905. Memory 1920 may be or may include a plurality of, possibly different memory units.

Executable code 1925 may be any executable code, e.g., an application, a program, a process, task or script. Executable code 1925 may be executed by controller 1905 possibly under control of operating system 1915. Executable code 1925 may comprise code for selecting an offer to be served and calculating reward predictions according to some embodiments of the invention.

In some embodiments, more than one computing system 1900 may be used. For example, a plurality of computing devices that include components similar to those included in computing system 1900 may be connected to a network and used as a system.

Storage 1930 may be or may include one or more storage components, for example, a hard disk drive, a Compact Disk (CD) drive, a CD-Recordable (CD-R) drive, a universal serial bus (USB) device or other suitable removable and/or fixed storage unit. For example, memory 1920 may be a non-volatile memory having the storage capacity of storage 1930. Accordingly, although shown as a separate component, storage 1930 may be embedded or included in memory 1920.

Input to and output from a computing system according to some embodiments of the invention may be via an API, such as API 1912 shown in FIG. 19. The API 1912 shown in FIG. 19 operates under the control of the controller 1905 executing instructions stored in memory 1920. Input to and output from the system via the API may be via input/output port 1913. Input may comprise data records, e.g. call data. Output may comprise categories, e.g. call reasons, and possibly also action instructions.

The call reason assignment system 502 may include user input devices. Input devices 1935 may be or may include a mouse, a keyboard, a touch screen or pad or any suitable input device. It will be recognized that any suitable number of input devices may be operatively connected to computing system 1900 as shown by block 1935.

The call reason assignment system may include one or more output devices, for example displaying call reasons or action instructions. Output devices 1940 may include one or more displays, speakers and/or any other suitable output devices. It will be recognized that any suitable number of output devices may be operatively connected to computing system 1900 as shown by block 1940. Any applicable input/output (I/O) devices may be connected to computing system 1900 as shown by blocks 1935 and 1940. For example, a wired or wireless network interface card (NIC), a modem, printer or a universal serial bus (USB) device or external hard drive may be included in input devices 1935 and/or output devices 1940.

Input devices 1935 and output devices 1940 are shown as providing input to the system 1900 via the API 1912 for the purpose of some embodiments of the invention. For the performance of other functions carried out by system 1900, input devices 1935 and output devices 1940 may provide input to or receive output from other parts of the system 1900.

Alternatively, all output from the call reason assignment system may be to a remote device such as another computer in which case the output devices may be replaced by a data port.

Some embodiments of the invention may include a computer readable medium or an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, some embodiments of the invention may comprise a storage medium such as memory 1920, computer-executable instructions such as executable code 1925 and a controller such as controller 1905.

A system according to some embodiments of the invention may include components such as, but not limited to, a plurality of central processing units (CPU), e g, similar to controller 1905, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computing system configured to categorize digital data records each data record relating to an interaction between a call center agent and a customer, and each interaction being an exchange between parties including one or more of: an exchange via telephone, an exchange with an interactive voice response "IVR" system, a web chat, an exchange via instant messaging, an exchange via short message service "SMS" messages, and an exchange via email and each data record comprising at least one of: text, automatically generated codes and audio information, each data record having one or more features indicative of a category of the data record, the system comprising:

a memory; and a processor comprising one or more processing modules including:

a rules module configured to receive as input a data record and to determine a first probability that the data record belongs to a category based one or more rules, each rule defining a relationship between at least one of said features and the category;

a probabilistic module configured to receive as input said data record and to determine a second probability that the data record belongs to the category based on one or more probabilistic models of relationships between one or more of said features and the category;

an arbitration module configured to determine whether or not the data record belongs to the category based on the first and second probabilities by converting the first probability into a first vote by comparing the first probability to a threshold and converting the second probability into a second vote by comparing the second probability to the threshold and if the first vote and second vote agree, determining whether the data record belongs to the category based on the votes, and if the votes disagree determining whether the data record belongs to the category based on the highest of the first probability and second probability weighted by historical performance; and an action module configured to receive from the arbitration module an indication that the interaction belongs to the category and to initiate an action appropriate to the category, the action selected from the group consisting of: follow-up interaction between a call center agent and the customer; initiation of an interaction with an party other than the customer; setting of a flag to ensure that the call reason has been resolved; scheduling of a follow up interaction; triggering of a preemptive email concerning issues known to be associated with the category; and automatic creation of customer history.

2. A system according to claim 1 in which the processing modules are configured to perform the determination whether or not a data record belongs to a category for each of a plurality of categories.

3. A system according to claim 1 wherein the processing modules further comprise a rule builder configured to use:
rules defining binary relationships between said at least one of said features and said category, and
a set of correctly classified data records,
to determine the first probability.

4. A system according to claim 3 in which the first probability is derived from the binary rules and the correctly classified data records using Bayes theory.

5. A system according to claim 3 in which the first probability is the sum of a calculated probability derived using the correctly classified data records and a biasing factor towards the upper confidence bound of the probability value.

6. A system according to claim 1 in which the probabilistic models are based on any of linear regression, logistic regression, decision tree, random forest, neural network, support vector machine and Bayesian network.

7. A system according to claim 1 in which the processing modules further comprise a probabilistic model builder configured to use:
features from the data records, and
a set of correctly classified records,
to derive at least one probabilistic model estimating the probability of a data record belonging to a category according to which of the extracted features are present in the data record;
and wherein the probabilistic models module is configured to use the derived probabilistic model(s) to determine the second probability.

8. A system according to claim 1 further comprising an arbitration strategy builder configured to determine a metric of the accuracy of the first and second probabilities respectively in determining whether a data record belongs to a category.

9. A system according to claim 8 wherein the arbitration strategy builder is further configured to perform the determination using a set of correctly classified data records and to repeat the determination using new correctly classified data records to update the metrics.

10. A system according to claim 1 wherein the first and second probabilities are weighted according to their distance from the predetermined threshold.

11. A method of categorizing digital data records, each data record relating to an interaction between a call center agent and a customer, each interaction being an exchange between parties including one or more of: an exchange via telephone, an exchange with an interactive voice response "IVR" system, a web chat, an exchange via instant messaging, an exchange via short message service "SMS" messages, and an exchange via email, each data record having one or more features and the method being carried out in a computer, the method comprising:
using a set of soft rules relating at least one of said features to a category to determine a first probability that a data record belongs to the category,
using a set of trained probabilistic models relating at least one of said features to said category to determine a second probability that a data record belongs to the category, converting the first probability into a first vote by comparing the first probability to a threshold and converting the second probability into a second vote by comparing the second probability to the threshold; and
determine on the basis of the first and second probabilities whether the data record belongs to a category by:
if the first vote and second vote agree, determining whether the data record belongs to the category based on the votes, and if the votes disagree determining that the data record belongs to the category based on the highest of the first probability and second probability weighted by historical performance.

12. A method according to claim 11 wherein at least one of the probabilistic models relates at least two different features to a category and is configured to take account of the relative importance of said different features.

13. A method according to claim 11 wherein the soft rules, the probabilistic models and the arbitration strategy are devised using a set of correctly classified data records, and where in the method further comprises updating one or more of the soft rules, the probabilistic models and the arbitration strategy using a new set of correctly classified data records.

14. A system for determining reasons for interactions between call center agents and customers, each interaction being represented as a data record having one or more features indicative of the reason for the call, and each interaction being an exchange between parties including one or more of: an exchange via telephone, an exchange with an interactive voice response "IVR" system, a web chat, an exchange via instant messaging, an exchange via short message service "SMS" messages, and an exchange via email, the system comprising:
a memory; and
a processor comprising one or more processing modules including:
a rules module configured to receive as input a data record and to determine a first probability that the interaction was for a particular reason based one or more rules, each rule defining a relationship between at least one of said features and the reason;

a probabilistic module configured to receive as input said data record and to determine a second probability that the interaction was for said particular reason based on one or more probabilistic models of relationships between one or more of said features and the reason;

an arbitration module configured to convert the first probability into a first vote by comparing the first probability to a threshold and convert the second probability into a second vote by comparing the second probability to the threshold and if the first vote and second vote agree, determine whether or not the interaction was for said reason based on the votes, and if the votes disagree determining whether or not the interaction was for said reason based on to the highest of the first probability and second probability weighted by historical performance; and an action module configured to receive from the arbitration module an indication that an interaction was for said particular reason and to initiate an action appropriate to the reason.

15. A system according to claim 14 in which the processing modules are configured to perform the determination whether or not an interaction occurred for a particular reason for each of a plurality of possible interaction reasons.

16. A system according to claim 14 further comprising a soft rules builder, a probabilistic models builder and an arbitration strategy builder configured to devise the soft rules, the probabilistic models and the arbitration strategy respectively using a set of correctly classified data records, and to update one or more of the soft rules, the probabilistic models and the arbitration strategy using a new set of correctly classified data records.

* * * * *